US009501420B2

(12) United States Patent
Susarla et al.

(10) Patent No.: US 9,501,420 B2
(45) Date of Patent: Nov. 22, 2016

(54) CACHE OPTIMIZATION TECHNIQUE FOR LARGE WORKING DATA SETS

(71) Applicant: NetApp, Inc., Sunnyvale, CA (US)

(72) Inventors: Sai Rama Krishna Susarla, Bangalore (IN); Sandeep Kumar Reddy Ummadi, Boulder, CO (US); William Patrick Delaney, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 17 days.

(21) Appl. No.: 14/520,532

(22) Filed: Oct. 22, 2014

(65) Prior Publication Data
US 2016/0117254 A1 Apr. 28, 2016

(51) Int. Cl.
*G06F 12/08* (2016.01)

(52) U.S. Cl.
CPC ....... *G06F 12/0897* (2013.01); *G06F 12/0842* (2013.01); *G06F 2212/283* (2013.01)

(58) Field of Classification Search
CPC .................. G06F 12/0842; G06F 12/0897
USPC ................. 711/141, 147, 148, 135, 137, 129
See application file for complete search history.

(56) References Cited

U.S. PATENT DOCUMENTS

| | | | | |
|---|---|---|---|---|
| 6,073,225 A | * | 6/2000 | James | G06F 11/349 |
| | | | | 711/148 |
| 8,219,758 B2 | * | 7/2012 | Wang | G06F 12/08 |
| | | | | 711/117 |
| 8,935,493 B1 | * | 1/2015 | Dolan | G06F 3/0649 |
| | | | | 711/117 |
| 9,330,736 B2 | * | 5/2016 | Michalak | G11C 7/1072 |
| 2005/0071601 A1 | | 3/2005 | Luick | |
| 2012/0131309 A1 | | 5/2012 | Johnson et al. | |
| 2012/0204000 A1 | | 8/2012 | Biran et al. | |
| 2012/0284587 A1 | | 11/2012 | Yu et al. | |
| 2013/0091331 A1 | | 4/2013 | Moratu et al. | |

OTHER PUBLICATIONS

PCT International Searching Authority—United States, Notification of Transmittal of the International Search Report and the Written Opinion of the International Searching Authority, or the Declaration, mailed Feb. 12, 2016, for International Application No. PCT/US2015/056673, 11 pages, Alexandria, Virginia.

* cited by examiner

*Primary Examiner* — Pierre-Michel Bataille
(74) *Attorney, Agent, or Firm* — Haynes and Boone, LLP (57) ABSTRACT

A system and method for recognizing data access patterns in large data sets and for preloading a cache based on the recognized patterns is provided. In some embodiments, the method includes receiving a data transaction directed to an address space and recording the data transaction in a first set of counters and in a second set of counters. The first set of counters divides the address space into address ranges of a first size, whereas the second set of counters divides the address space into address ranges of a second size that is different from the first size. One of a storage device or a cache thereof is selected to service the data transaction based on the first set of counters, and data is preloaded into the cache based on the second set of counters.

17 Claims, 9 Drawing Sheets

| Address Range | Interval of Access N | Interval of Access N-1 | Interval of Access N-2 | Interval of Access N-3 | Interval of Access N-4 | No. of Times Accessed |
|---|---|---|---|---|---|---|
| Memory Address A' | 5 | 4 | 3 | 2 | 1 | 5 |
| Memory Address B' | 4 | 3 | 1 | 0 | 0 | 3 |
| Memory Address C' | 4 | 0 | 0 | 0 | 0 | 1 |
| Memory Address D' | 5 | 3 | 1 | 0 | 0 | 3 |
| Memory Address E' | 3 | 0 | 0 | 0 | 0 | 1 |
| Memory Address F' | 0 | 0 | 0 | 0 | 0 | 0 |
| Memory Address G' | 0 | 0 | 0 | 0 | 0 | 0 |
| Memory Address H' | 5 | 2 | 1 | 0 | 0 | 3 |

Figure 6B

CACHE OPTIMIZATION TECHNIQUE FOR LARGE WORKING DATA SETS

TECHNICAL FIELD

The present description relates to data caching and, more specifically, to a system and method for accurately anticipating subsequent data transactions and for proactively caching target data.

BACKGROUND

Hierarchically arranged memory has been a common feature in computing for some time. Fundamentally, faster memory is more expensive per byte. Despite rapid advances in storage performance, it is often economically unsound to utilize only the lowest latency storage medium. Instead, in order to deliver acceptable performance within a fixed budget, storage devices of different sizes and speeds may be arranged so that memory transactions read or write to the fastest devices whenever possible.

In a typical example, a hierarchical memory structure includes a main memory and one or more caches. The main memory is a large pool of storage, and, for reasons including cost, is often made up of relatively slow storage devices. The main memory defines the address space and thereby defines the limits of the available storage. However, portions of the address space may be mapped to a cache, a smaller memory pool typically utilizing a faster storage medium, so that transactions directed to mapped addresses can be read from and/or written to the faster storage medium. In multiple-tiered configurations, portions of the cache may be mapped to another cache made up of an even-faster storage medium. In many examples, memory structures include multiple caches, each utilizing progressively faster storage media.

A number of techniques exist for determining which data to load in a particular cache. By effectively predicting data that will be the target of subsequent transactions, more transactions can be performed by the cache even when the cache is significantly smaller than the main memory. These techniques are grounded in a number of principles, such as the principles of locality. The principle of temporal locality suggests that data that has been accessed recently is likely to be accessed again. Accordingly, frequently accessed data is often cached. The principle of spatial locality suggests that data accesses tend to cluster around certain addresses. Accordingly, a range of addresses is often cached based on an access to an address within the range. However, these principles are merely guidelines. Because every application and computing task has a unique data access pattern, no particular caching algorithm is optimal for all applications. Instead, a balance may be struck based on the anticipated use or uses of a given computing system. Unfortunately, this balance may break down when the working data set of an application grows beyond a certain point. The overhead involved caching and writing back a large data set may diminish the performance gains expected from the cache.

For example, storage systems, computing systems that process data transactions on behalf of other computing systems, are generally very cache-sensitive and often manipulate large data sets. This can be caused by the large numbers of transactions typically received by storage systems and the widely varying workloads depending on host activity. These effects and others make it extremely difficult to tune a single cache algorithm for all supported host applications. Accordingly, an efficient system and method for caching that is responsive to an application's working set has the potential to dramatically improve cache hit rate and system performance.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and computer programs for predicting disk access patterns and caching data accordingly. The techniques herein recognize access patterns within large working data sets, which in some embodiments may be 100 GB or more. Once the working set is identified, a portion of the cache can be preloaded in anticipation of subsequent transactions. In order to do this, in some examples, a computing system tracks incoming data transactions using two or more sets of counters. The first set of counters has a small granularity, tracks small address ranges with precision, and updates frequently. The first set of counters may be used to determine whether to cache data based on incoming data transactions and to determine when to evict data from the cache. In contrast, the second set of counters, which may update in parallel, has a much larger granularity. An address range in the second set of counters may be 1 GB or more. The second set of counters also tracks activity over larger periods of time. In one example, the second set of counters identifies address ranges that have seen consistent use for several minutes. At selected intervals, the second set of counters is used to preload the cache with one or more of the larger data sets that has shown consistent demand.

This technique has been shown to be especially effective in computing environments where applications manipulate large data sets such as a large database. When such an application does not repeatedly access the same data values, conventional caching techniques may not prove effective because the cached data is not useful in subsequent transactions. However, by identifying the working set and by recognizing that subsequent transactions are likely to access the working set, the techniques of the present disclosure are able to accurately anticipate these subsequent transactions and to preload the cache. In some environments, this technique has been shown to produce cache hit rates of 70% or more. In addition to the performance benefits, in some embodiments, this technique may be leveraged to reduce cache size while maintaining or even improving performance, thereby reducing system cost. In some embodiments, the technique also self-disables when the running applications do not consistently access a large working set, thus freeing up the cache for use by other caching processes.

Figure 1:
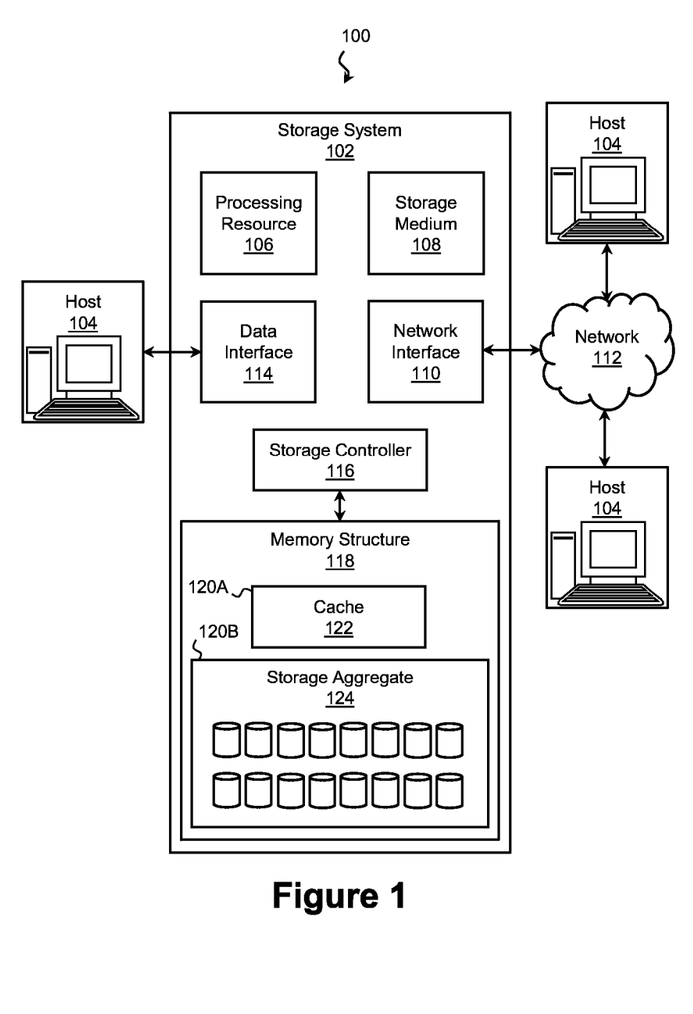
FIG. 1 is an organizational diagram of a data storage architecture according to aspects of the present disclosure.

FIG. 1 is an organizational diagram of a data storage architecture 100 according to aspects of the present disclosure. The data storage architecture 100 includes a storage system 102 that processes data transactions on behalf of other computing systems including one or more hosts 104. The storage system 102 receives data transactions (e.g., requests to read and/or write data) from the hosts 104, and takes an action such as reading, writing, or otherwise accessing the requested data. For many exemplary transactions, the storage system 102 returns a response such as requested data and/or a status indictor to the respective host 104. The storage system 102 is merely one example of a computing system that may be used in conjunction with the systems and methods of the present disclosure.

The storage system 102 is a computing system and, in that regard, may include a processing resource 106 (e.g., a microprocessor, a microprocessor core, a microcontroller, an application-specific integrated circuit (ASIC), etc.), a non-transitory computer-readable storage medium 108 (e.g., a hard drive, flash memory, random access memory (RAM), optical storage such as a CD-ROM, DVD, or Blu-Ray device, etc.), a network interface device 110 (e.g., an Ethernet controller, wireless communication controller, etc.) operable to communicate with one or more hosts 104 over a network 112, and a data interface 114 operable to communicate with one or more hosts 104 without necessarily using a network.

The storage system 102 also includes one or more storage controllers 116 in communication with a hierarchical memory structure 118. The memory structure 118 may include any number of tiers (including tiers 120A and 120B) and, in an exemplary embodiment, includes a cache 122 at the first (highest) tier 120A and a storage aggregate 124 at the second (lowest) tier 120B. In further embodiments, the cache 122 of the memory structure 118 includes multiple cache levels, which may be referred to by level number (e.g., level 1 cache, level 2 cache, etc.) with lower numbers being higher in the hierarchy of the memory structure 118. The storage aggregate 124 and the cache 122 are made up of any suitable storage devices using any suitable storage media including electromagnetic hard disk drives (HDDs), solid-state drives (SSDs), flash memory, RAM, optical media, and/or other suitable storage media. Each tier may include devices of single type (e.g., HDDs) or may include a heterogeneous combination of mediums (e.g., HDDs with built-in RAM caches).

Typically, faster devices are used in higher tiers of the memory structure 118. As shown in FIG. 1, the cache 122 is higher in the hierarchy than storage aggregate 124. Accordingly, in one embodiment, the storage aggregate 124 includes a plurality of HDDs arranged in a Redundant Array of Independent Disks (RAID) configuration, whereas the cache 122 includes a plurality of solid state drives (SSDs) and/or random-access memory configured as a RAM disk. This is a common configuration for a storage system 102 in part because of the increased performance of SSDs with respect to HDDs. In a further embodiment, storage aggregate 124 includes a number of RAID HDDs, while the cache 122 includes a RAM disk as a level 1 cache and a number of SSDs as a level 2 cache. Of course, these configurations are merely exemplary, and the storage aggregate 124 and the cache 122 may each include any suitable storage device or devices in keeping with the scope and spirit of the present disclosure.

The storage system 102 receives memory transactions from the hosts 104 directed to the data of the memory structure 118. During operation, the storage system 102 may also generate memory transactions independent of those received from the hosts 104. Memory transactions are requests to read, write, or otherwise access data stored within a computer memory such as the memory structure 118, and are often categorized as either block-level or file-level. Block-level protocols designate data locations using an address within the memory structure 118. Exemplary block-level protocols include iSCSI, Fibre Channel, and Fibre Channel over Ethernet (FCoE). iSCSI is particularly well suited for embodiments where data transactions are received over a network 112 that includes the Internet, a Wide Area Network (WAN), and/or a Local Area Network (LAN). Fibre Channel and FCoE are well suited for hosts 104 that are coupled to the storage system 102 via a direct connection such as that provided by the data interface 114. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system 102 that responds to file-level transactions. It is understood that the scope of present disclosure is not limited to either block-level or file-level protocols, and in many embodiments, the storage system 102 is responsive to a number of different memory transaction protocols.

When a memory transaction is received by the storage system 102 or generated by the storage system 102, the storage system 102 may attempt to carry out the transaction at the higher tiers of the memory structure 118 hierarchy. As higher tiers of the hierarchy typically include faster storage media, servicing a transaction at a higher tier often reduces transaction latency and improves data throughput. In an exemplary embodiment, the storage controller 116 first checks a target memory address of the transaction against the address space of the cache 122. If the target memory address falls within the address space of the cache 122 (i.e., the address "hits" the cache 122), the storage controller 116 services the request using the cache 122. If the target memory address is not within the address space of the cache 122 (i.e., the address "misses" the cache 122), the storage controller 116 checks the target memory address against the next highest tier, working its way down to the final tier, the storage aggregate 124. When a cache miss occurs, the target data may be loaded into the cache in anticipation of a subsequent transaction accessing the same data. As a cache fills, data that has not been accessed recently is evicted from the cache, which may include writing the evicted data to a lower tier of the memory structure 118. In the optimal case, as the cache is filled with in-demand data (i.e., the cache becomes "hot"), a greater percentage of transactions are serviced by the cache.

Figure 2:
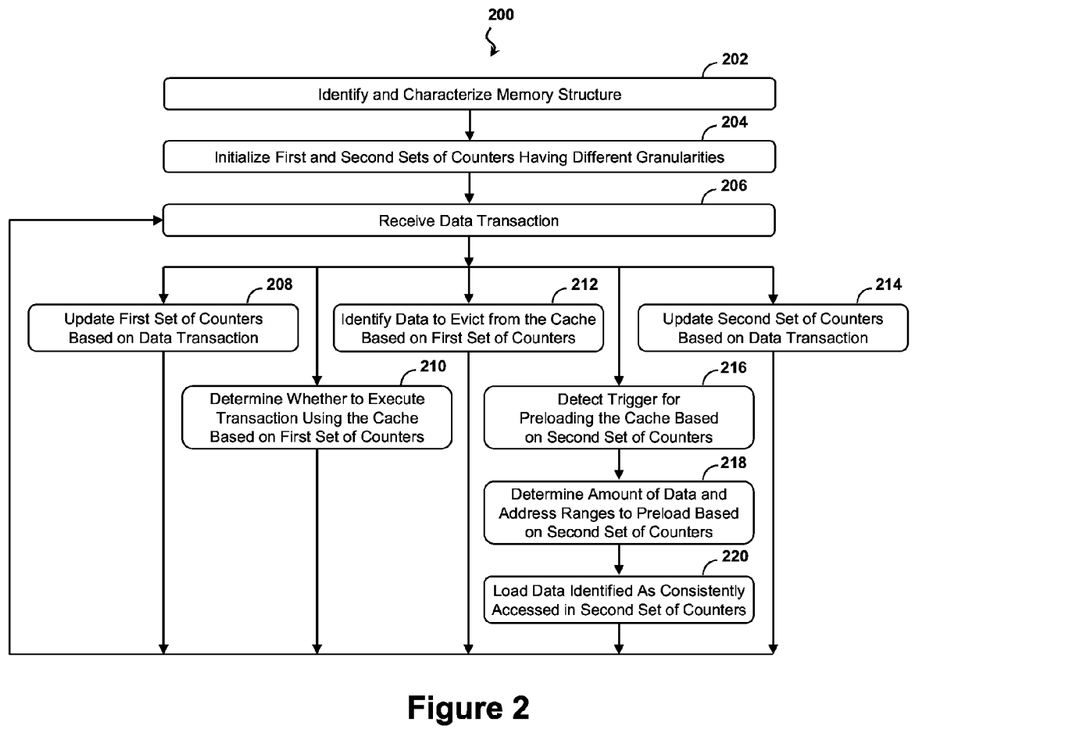
FIG. 2 is a flow diagram of a method of monitoring data transactions and managing a cache according to aspects of the present disclosure.
Figure 3:
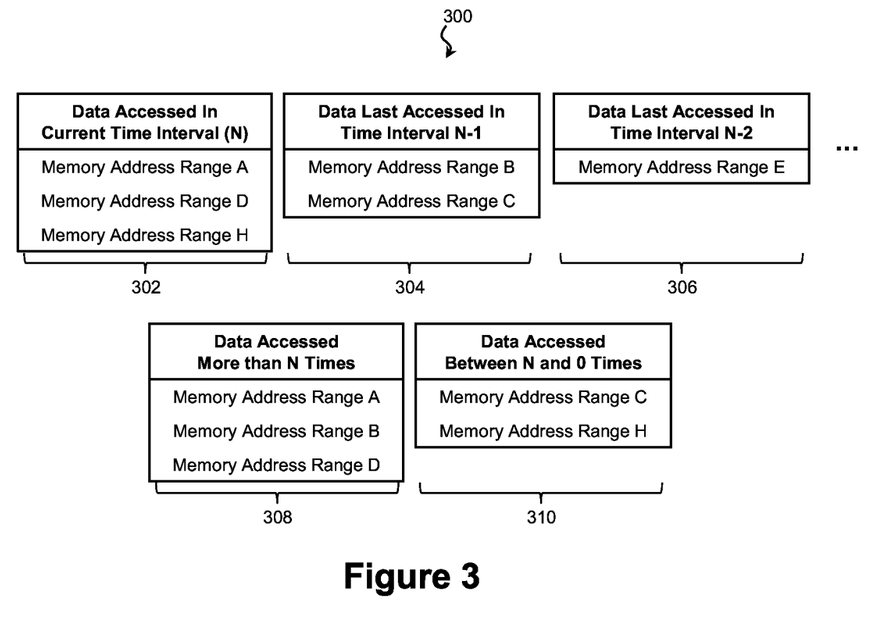
FIG. 3 is a memory diagram of a first set of counters according to aspects of the present disclosure.
Figure 4A:
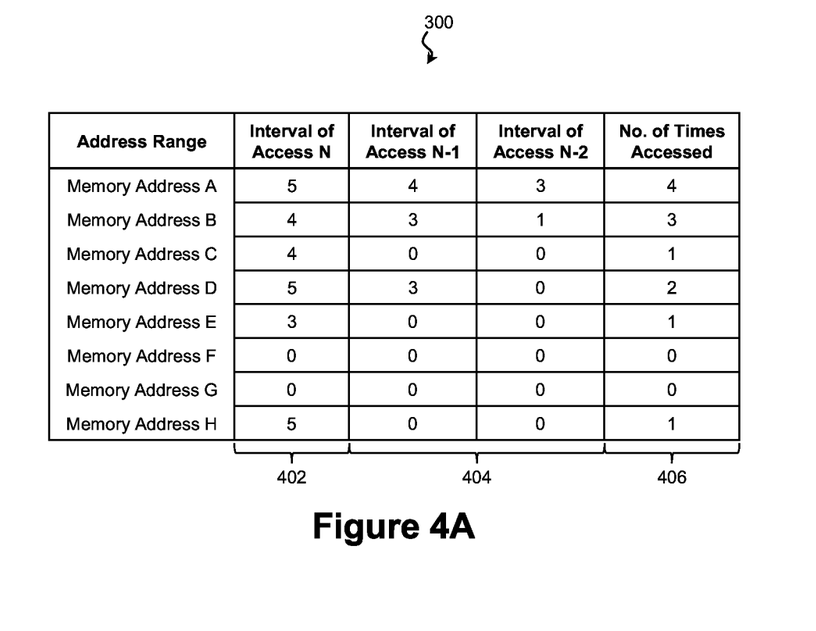
FIGS. 4A and 4B are memory diagrams of an alternate representation of the first set of counters according to aspects of the present disclosure.
Figure 4B:
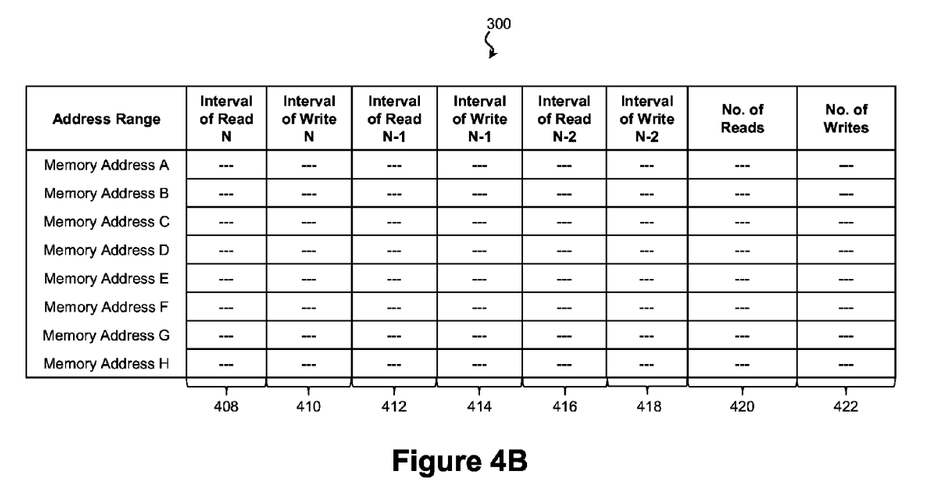
Figure 5A:
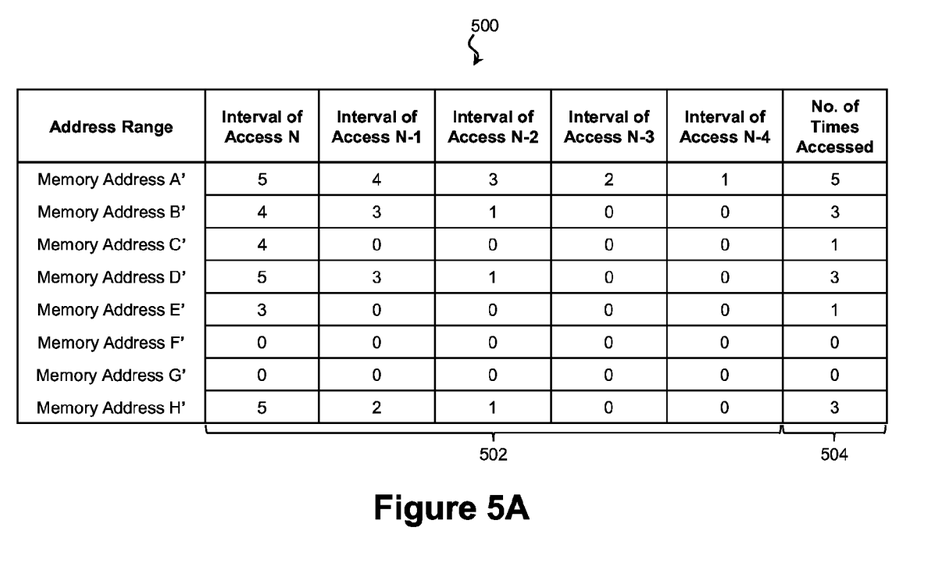
FIGS. 5A and 5B are memory diagrams of a second set of counters according to aspects of the present disclosure.
Figure 5B:
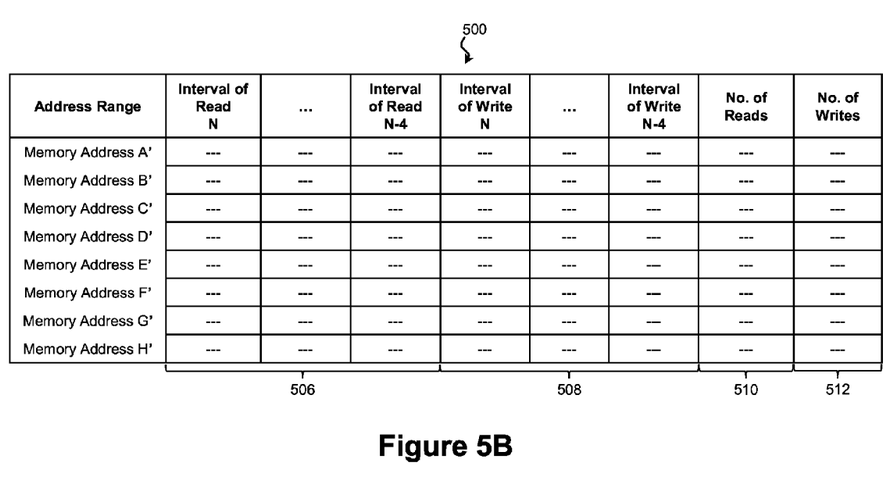
Figure 6A:
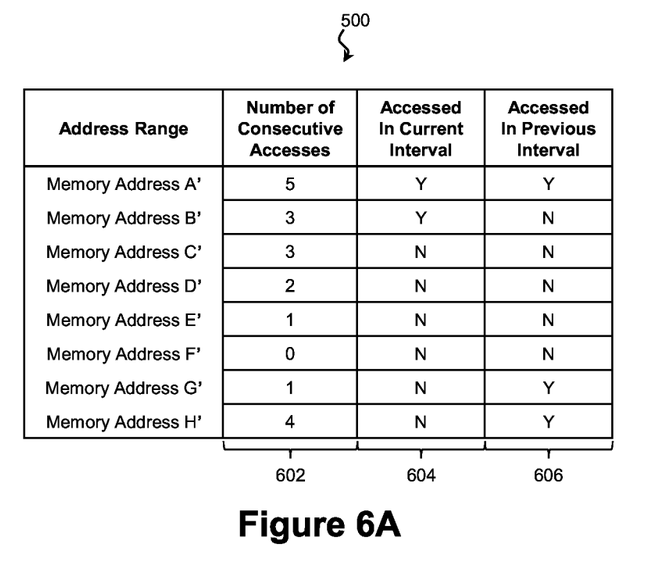
FIGS. 6A and 6B are memory diagrams of an alternate representation of the second set of counters according to aspects of the present disclosure.
Figure 6B:
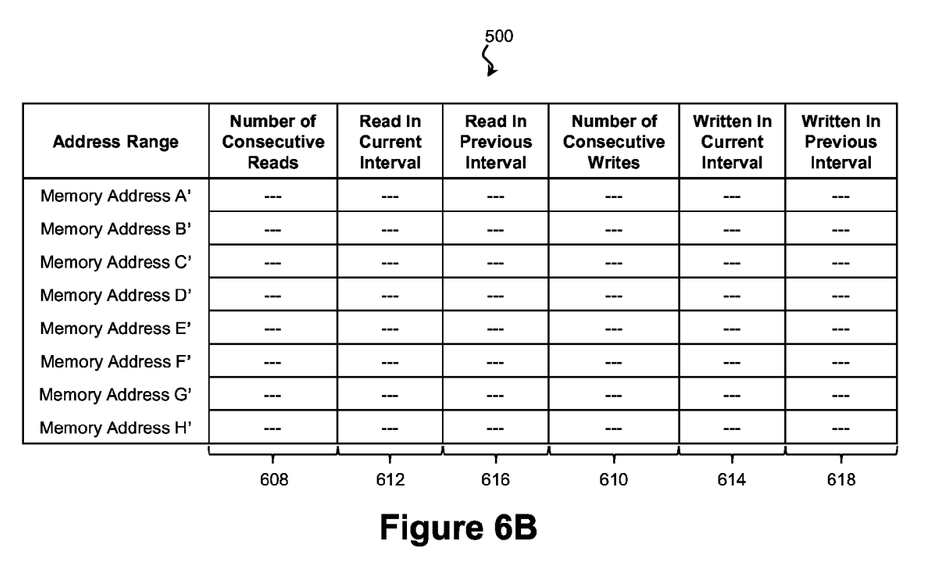

A method of cache management optimized for large working data sets is described with reference to FIGS. 2-6. FIG. 2 is a flow diagram of a method 200 of monitoring data transactions and managing a cache according to aspects of the present disclosure. It is understood that additional steps can be provided before, during, and after the steps of method 200, and that some of the steps described can be replaced or eliminated for other embodiments of the method. The method 200 is suitable for performing using a computing system such as the storage system 100 described with respect to FIG. 1. FIG. 3 is a memory diagram of a first set of counters 300 according to aspects of the present disclosure. FIGS. 4A and 4B are memory diagrams of an alternate representation of the first set of counters 300 according to aspects of the present disclosure. FIGS. 5A and 5B are memory diagrams of a second set of counters 500 according to aspects of the present disclosure. FIGS. 6A and 6B are memory diagrams of an alternate representation of the second set of counters 500 according to aspects of the present disclosure.

As described in detail below, the method 200 tracks data transactions using a variety of metrics in order to predict data involved in subsequent transactions. Data expected to be accessed in the future is loaded into one or more caches. The method 200 records and analyzes transactions over both short- and long-term time frames. By doing so, the computing system can better detect overall patterns of data access and determine the working data set of a particular application.

The method begins by identifying and characterizing the memory structure 118 as shown in block 202 of FIG. 2. This may include determining the number of devices at a hierarchical level, determining device capacities, determining respective address spaces, determining device configuration such as RAID structure, determining device performance metrics, and/or determining other suitable attributes or metrics. In an embodiment, the computing system characterizes the storage aggregate 124 for purposes including determining the address space and the total amount of data that can be stored. In the embodiment, the computing system also characterizes one or more caches 122 of the memory structure 118 for purposes including determining the amount of data that can be cached at each tier. Referring to block 204 of FIG. 2, the computing system initializes a first set of counters 300 and a second set of counters 500 based on the characterization of the memory structure 118. The counters, which are described in more detail below, keep track of data transactions directed to the memory structure 118 and are used to manage the cache 122. Accordingly, the counters may record any suitable metric including the last one or more accesses and/or the number of times accessed.

Referring to block 206 of FIG. 2, the computing system receives a data transaction. The data transaction may be received from a host 104, may be generated by an application running on the computing system, and/or may be received from another source. In addition to servicing the transaction, the computing system records the transaction using the first and second sets of counters in order to assess the demand for the underlying data. Referring to block 208 of FIG. 2 and to FIG. 3, the computing system updates the first set of counters 300 based on the received data transaction. The first set of counters 300 is used for loading data into the cache 122 and for evicting data from the cache 122. Accordingly, the first set of counters 300 may track how long ago an address was last requested, how many recent transactions have requested an address, and other transaction details.

The first set of counters may be stored in any suitable format including a linked list, a tree, a table such as a hash table, an associative array, a state table, a flat file, a relational database, and/or other memory structure. An exemplary representation of the first set of counters 300 is shown in FIG. 3, and the values in the first set of counters 300 have been simplified for clarity. In the illustrated embodiment, the first set of counters 300 divides the total address range (referred to as the address space for clarity) of the memory structure 118 into discrete increments. In an exemplary embodiment, data is read to or written from the cache in units referred to as pages, and the counter increment size is selected to be the page size. In other words, each page of the address space has a corresponding entry in the first set of counters 300. In various examples, page sizes range from about 4 KB to about 1 MB.

The counters 300 record statistics associated with each address range. In the illustrated embodiment, the first set of counters 300 records those address ranges accessed in the current time interval, as shown by values 302. Similar to address ranges, periods of time may be grouped into intervals of any size and assigned a discrete integer value. In an exemplary embodiment, a time interval is on the order of 1 ms. The first set of counters 300 may also record those address ranges last accessed in one or more preceding time interval, as shown by values 304 and 306. In some embodiments, the first set of counters 300 records address ranges that have been accessed a certain number of times since an event, such as the data being written into a cache 122 or the start of a time interval, as shown by values 308 and 310. In the illustrated embodiment, the first set of counters 300 includes separate entries for those address ranges that have been accessed: 1) more than a first threshold amount (e.g., twice or more), 2) less than the first threshold but more than a second threshold amount (e.g., once), and 3) less than both the first and second thresholds (e.g., zero). It is understood that the threshold amounts are merely exemplary and other threshold amounts and numbers of thresholds are both contemplated and provided for. For example, in some embodiments, reads and writes are tracked separately.

Another suitable representation of the first set of counters 300 is illustrated in FIG. 4A. Rather than maintaining data as a list, the representation of FIG. 4A is similar to a bitmap in that each address range increment in the address space has a set of associated counter values. The counter values may record any suitable metric, including the examples above. In the illustrated embodiment, the first set of counters 300 records the last N times the address range was accessed including the interval of the most recent access. In that regard, the entries recording the most recent access (indicated as access N) are shown by values 402, while the entries recording previous accesses are shown by values 404. Additionally or in the alternative, the first set of counters 300 may record how many times an address range has been accessed since an event, as shown by values 406. For example, the first set of counters 300 may record how many times an address range has been accessed since the data was written into a cache 122 and/or how many times it has been accessed since the start of some interval of time.

Referring to FIG. 4B, in some embodiments, the first set of counters 300 tracks read accesses and write accesses independently. In some such embodiments, the first set of counters 300 include entries recording the most recent reads and writes (values 408 and 410, respectively) to the address ranges, entries recording previous reads and writes (values 412-418) to the address ranges, and/or entries recording how many times an address range has been read and written since an event (values 420 and 422, respectively).

In some embodiments, the first set of counters 300 only tracks utilization of data that is currently cached, whereas in other embodiments, the first set of counters 300 tracks data utilization throughout the entire address space. In yet further embodiments, the first set of counters 300 includes some information, such as time of last access, for each address range in the entire address space, and some information, such as an access count, for only those address ranges that are currently cached.

Referring to block 210 of FIG. 2, in parallel with the tracking of block 208, the computing system makes a determination of whether to execute the data transaction using the cache 122. For a transaction where the target data is already stored in the cache 122 and is valid, the default behavior may be to read from the cache 122 or write to the cache 122 without any further consideration. However, for a transaction where the target data has not yet been cached, the computing system may determine whether to cache the target data based in part on the first set of counters 300. For example, an aggressive caching algorithm may cache 122 data on the first transaction directed to the data, whereas a less-aggressive algorithm may consider the number of times in which the data has been accessed since a given event, as recorded in the first set of counters 300. In one such embodiment, the computing system examines the first set of counters 300 to determine if the data has been accessed two or more times, and if so, the data is loaded into the cache 122 by either executing a write transaction or loading the data from the storage aggregate 124 for a read transaction. The computing system may also utilize any other suitable consideration or metric to determine whether to execute the data transaction using the cache 122.

Referring to block 212 of FIG. 2, in parallel with the tracking of block 208, the computing system makes a determination of what data to evict from the cache 122. Evicting data allows it to be overwritten in the cache 122 and, if the cache data is more recent than that in the lower tiers of the hierarchy, may include writing back the data to the lower tiers such as lower-level cache 122 tiers and/or the storage aggregate 124. In some embodiments, the computing system evicts old data from the cache 122 each time new data is loaded into the cache 122. However, due to the overhead involved in cache eviction, in some embodiments, the computing system evicts data at regularly scheduled intervals. Any suitable caching algorithm may be used, and in a variety of embodiments, the computing system uses a least recently used (LRU) technique, a least frequently used (LFU) technique, an adaptive replacement cache (ARC) technique, and/or other suitable technique. For example, in some such embodiments, the computing system analyzes the first set of counters 300 to determine those cache blocks that have gone the longest without being accessed (LRU). Furthermore, in some such embodiments, the computing system analyzes the first set of counters 300 determine those cache blocks that have been accessed the fewest times since an event such as being cached (LFU). As part of the eviction process, data in the evicted cache entries may be written (i.e., flushed) to a lower level of the hierarchy such as the storage aggregate 124. While the data is evicted in block 212 based on the first set of counters 300, the evicted data is not limited to that loaded in response to the first set of counters 300. In other words, data preloaded into the cache 122 based on the second set of counters 500 as described below may be evicted based on the first set of counters 300.

While the caching of blocks 208-212 may be sufficient in environments where applications typically access the same data repeatedly, it is been determined through experimentation and observation that some applications have relatively little temporal locality (tendency to repeatedly access the same address range) but have significant spatial locality (tendency to access nearby addresses) within a particular working set of data. In particular, database applications, web server applications, and other storage system applications have been shown to have a stable working set of data, although the working set may be 100 GB or more. It may not be either practical or desirable to increase the page size to approach the size of the working set, especially where cache writes and cache eviction entails reading and writing an entire page. Instead, the method 200 tracks data transactions over a prolonged period of time in order to identify the working set. Once identified, the working set or significant portion thereof can then be preloaded into the cache 122 in anticipation of subsequent transactions directed to the working set.

Referring to block 214 of FIG. 2 and to FIG. 5A, the computing system also records the data transaction of block 206 in a second set of counters 500. In contrast to the first set of counters 300, the second set of counters 500 is used to identify data access patterns within larger address ranges in order to preload data into the cache 122. In many regards, the second set of counters 500 is similar to the first set of counters 300. However, the address range increment is larger for the second set of counters 500 than for the first set of counters 300. For example, in an embodiment, an address range in the first set of counters 300 is about 1 MB while an address range in the second set of counters 500 is about 1 GB. In addition, the time interval of the second set of counters 500 may be larger than that of the first set of counters 300. In an exemplary embodiment, the time interval for the second set of counters 500 is about 1 minute and each minute is assigned an integer value. Thus, the second set of counters 500 has a lower granularity than the first set of counters 300.

The second set of counters 500 may record any suitable data access metric. In various embodiments, the second set of counters 500 records those address ranges experiencing data accesses in various time intervals. The second set of counters 500 may be stored in any suitable format including a linked list, a tree, a table such as a hash table, an associative array, a state table, a flat file, a relational database, and/or other memory structure. An exemplary representation of the second set of counters 500 is shown in FIG. 5A, and the values in the second set of counters 500 have been simplified for clarity. In the illustrated embodiment, the second set of counters 500 records the time of the last N accesses of a given address range, as shown by values 502. N may be selected to match the number of consecutive time intervals of use that qualifies an address range for preloading. In one example, an address range qualifies if it is accessed at least once a minute for at least five consecutive minutes, and accordingly, N is selected to be five. By storing the last N accesses, the computing system may determine whether the time intervals are consecutive by comparing the interval of the most recent access to the interval of the oldest recorded access. If the intervals were consecutive, the difference should equal N−1. The second set of counters 500 may record any other suitable metric including the number of accesses since an event such as the data being written into a cache 122 or the start of a time interval (values 504).

Referring to FIG. 5B, in some embodiments, the second set of counters 500 track read accesses and write accesses separately. In some such embodiments, the second set of counters 500 include entries recording the last N read and write accesses of given address ranges (values 506 and 508, respectively), and/or entries recording how many times an address range has been read and written since an event (values 510 and 512, respectively).

Of course, these are merely some of many possible representations of the second set of counters 500. Another suitable representation of the second set of counters 500 is illustrated in FIG. 6A. Instead of storing the last N accesses, the second set of counters 500 may instead record the number of consecutive time intervals in which each address range has been accessed. In the illustrated embodiment, the second set of counters 500 includes a record for each address range indicating the number of consecutive time intervals in which the data has been accessed, as shown by values 602. In the example, the second set of counters 500 also includes a flag for each address range indicating whether the address range has been accessed during the current time interval, as shown by values 604, and a flag indicating whether the address range was accessed during the previous time interval, as shown by values 606. The first time an address range is accessed during a time interval (which can be determined from the value 604), the computing system determines whether the address range was also accessed during the previous time interval (which can be determined from the value 606). If so, then the access represents another consecutive request for the data, and the record 602 indicating the number of consecutive time intervals in which the address range has been accessed is incremented by one. If not, then the access represents a nonconsecutive request for the data, and the record 602 indicating the number of consecutive time intervals in which the address range has been accessed is set to one. At the end of a time interval, flags 604 indicating accesses during the current time interval are moved to replace the flags 606 indicating accesses during the previous interval.

In such embodiments, address ranges qualified for preloading may be identified as those having a record 602 of consecutive time intervals greater than a threshold. In one example, an address range qualifies if it is accessed at least once a minute for at least five consecutive minutes, and accordingly, the threshold is selected to be five.

Referring to FIG. 6B, shown are some embodiments in which the second set of counters 500 records the number of consecutive time intervals in which each address range has been read and/or written. In some such embodiments, the second set of counters 500 include entries recording the number of consecutive reads and writes (values 608 and 610, respectively) to an address range, entries recording whether an address range has been read from or written to in the current interval (values 612 and 614, respectively) and/or entries recording whether an address range was read from or written to in the previous interval (values 616 and 618, respectively). Of course, these representations of the second set of counters 500 are merely exemplary, and in further embodiments other memory structures and techniques are used to track periods of prolonged data access.

In some embodiments, the second set of counters 500 only tracks a subset of the total address space, for example, selected volumes of the total volumes, whereas in other embodiments, the second set of counters 500 tracks data utilization throughout the entire address space. In yet further embodiments, the second set of counters 500 includes some information for each address range in the address space and records other information for only a subset thereof.

Referring to block 216 of FIG. 2, in parallel with the tracking of block 214, the computing system detects a triggering event that initiates a preload of the cache 122 based on the second set of counters 500. A wide range of triggering events are contemplated and provided for, including triggers determined by the computing system and those received from another entity. For example, in some embodiments, the preloading of the cache 122 is triggered at regular intervals. The amount of time between preloads may be fixed or determined based on data access patterns, cache performance, cache status, and/or other suitable metrics. The amount of time between preloads may also be determined by an operator command or application running on the computing system or any other system. In one such embodiment, the intervals are adjusted so that preloads occur more often when cache utilization falls below a threshold. Furthermore, in one such embodiment, the intervals are adjusted so that preloads occur more often when the cache hit rate falls below a threshold. In some embodiments, an operator, application, and/or other process may request that a preload occur even if the assigned interval has not yet elapsed.

Referring to block 218 of FIG. 2, when the computing system determines the preload should occur, the computing system further determines the amount of data and the address ranges to preload based in part on the second set of counters 500. In some embodiments, attributes recorded in the second set of counters 500, such as the number of consecutive intervals in which the data has been accessed, set a ceiling or maximum amount of data to preload. Within this ceiling, the actual amount of data preloaded may then be determined based on cache status or other considerations. One advantage of using the second set of counters 500 to set a ceiling is that it makes the preloading technique self-disabling. For example, in one such embodiment, if no address ranges have met the target number of consecutive intervals, no data is preloaded. In this way, if data transactions do not routinely access large data ranges consistently, the preload will not occur and the corresponding cache space will not be "wasted". In embodiments in which the second set of counters 500 record read accesses and write accesses independently, the amount of data to be preloaded may be identified by any combination of read access data and/or write access data.

In some embodiments, aspects of the cache set a ceiling or maximum amount of data to preload. For example, the computing system may limit the total amount of preload data to a percentage of the total cache size (e.g., 90%). In some embodiments, the computing system does not allow data in the cache 122 to be evicted by the preload and accordingly limits the total amount of preload data to a percentage of the available cache space. In some embodiments, the computing system sets the ceiling based on a cache hit rate by increasing the amount of available space if the hit rate falls below a threshold. In order to comply with the ceiling, when the amount of data eligible for preloading exceeds the amount of space available in view of the cache, one or more preloading thresholds may be increased. In one such example, the minimum number of consecutive intervals of use to be eligible for preloading is increased, and the second set of counters 500 are re-assessed based on the increased threshold.

Referring to block 220 of FIG. 2, once the data to be preloaded into the cache is identified, the computing system loads data from the one or more address ranges identified as being consistently accessed according to the second set of counters 500. In this way, the method 200 is able to determine access patterns within large address ranges that indicate a particular working set for one or more running applications. By preloading the address ranges within the working set, the data is made available from the faster elements of the storage architecture 100 including the uppermost levels of the cache 122. By carefully managing the preloads, the method 200 is able to load the larger working data sets without crowding higher granularity caching, such as that performed using the first set of counters 300. In embodiments in which the second set of counters 500 record read accesses and write accesses independently, the data to be preloaded may be identified based on any combination of read access data and/or write access data.

As can be seen in FIG. 2, the method 200 repeats so that one or more of blocks 208-220 is performed as each data new transaction is received.

The present embodiments can take the form of an entirely hardware embodiment, an entirely software embodiment, or an embodiment containing both hardware and software elements. In that regard, in some embodiments, the computing system is programmable and is programmed to execute processes including those associated with cache modeling such as the processes of method 200 of FIG. 2. Accordingly, it is understood that any operation of the computing according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides a system and method for anticipating subsequent data transactions by recognizing access patterns across large data sets and for preloading a cache accordingly. In some embodiments, the method for managing a cache in a computing system includes receiving a data transaction directed to an address space and recording the data transaction in a first set of counters and in a second set of counters. The first set of counters divides the address space into address ranges of a first size, and the second set of counters divides the address space into address ranges of a second size that is different from the first size. One of a storage device or a cache thereof is determined to service the data transaction based on the first set of counters, while data is preloaded into the cache based on the second set of counters. In one such embodiment, data is evicted from the cache based on the first set of counters.

In further embodiments, the computing device includes a memory hierarchy including a storage aggregate and at least one cache, a program memory containing machine readable medium comprising machine executable code having stored thereon instructions for performing a method of cache management; and a processor coupled to the program memory. The processor is configured to execute the machine executable code to: identify an address space of the memory hierarchy and to receive a data transaction directed to an address within the address space. The processor is also configured to record a first aspect of the data transaction according to a first address range and to record a second aspect of the data transaction according to a second address range that is larger than the first address range. The processor services the data transaction using at least one of the storage aggregate or the at least one cache based on the recorded first aspect and loads a data set into the cache based on the recorded second aspect. In one such embodiment, the processor determines the data set to have been consistently accessed for a duration of time based on the recorded second aspect and loads the data set into the cache based on the determination. In one such embodiment, the processor adjusts the duration of time based on at least one of: an amount of available space in the cache or a cache hit rate.

In yet further embodiments the non-transitory machine readable medium having stored thereon instructions for performing a method of cache management comprises machine executable code. When executed by at least one machine, the code causes the machine to: identify a memory structure of a computing system; receive a data transaction directed to an address space of the memory structure; record the data transaction in a first set of counters; record the data transaction in a second set of counters having a different granularity that the first set of counters; identify a hierarchical level of the memory structure to service the data transaction based on the first set of counters; identify a first data set within a cache of the memory structure to evict based on the first set of counters; and load a second data set into the cache based on the second set of counters. In one such embodiment, the medium comprises further machine executable code that causes the machine to: determine a size of the second set of data loaded into the cache based on at least one of: an amount of space available in the cache, a predetermined percentage of a total capacity of the cache, or a cache hit rate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    receiving a data transaction directed to an address space;
    recording the data transaction in a first set of counters and in a second set of counters,
        wherein the first set of counters divides the address space into address ranges of a first size,
        wherein the second set of counters divides the address space into address ranges of a second size that is different from the first size,
        wherein the first set of counters record transaction data according to time intervals of a first duration, and
        wherein the second set of counters record transaction data according to time intervals of a second duration that is different from the first duration;
    determining, using at least one processor, one of a storage device or a cache thereof to service the data transaction based on the first set of counters; and
    preloading data into the cache based on the second set of counters.

2. The method of claim 1 further comprising evicting data from the cache based on the first set of counters.

3. The method of claim 1, wherein the preloading of the data into the cache includes identifying an address range as being consistently accessed over a consecutive period of time based on the second set of counters, and wherein the data loaded into the cache corresponds to the address range identified as being consistently accessed over the consecutive period of time.

4. The method of claim 1, wherein the preloading of the data into the cache is further based on an amount of space available in the cache.

5. The method of claim 1, wherein the preloading of the data into the cache is further based on a percentage of a total capacity of the cache.

6. The method of claim 1, wherein the preloading of the data into the cache is performed at a time based on at least one of: cache utilization, a cache performance metric, or an operator command.

7. A method comprising:
receiving a data transaction directed to an address space;
recording the data transaction in a first set of counters and in a second set of counters, wherein the first set of counters divides the address space into address ranges of a first size, and wherein the second set of counters divides the address space into address ranges of a second size that is different from the first size;
determining, using at least one processor, one of a storage device or a cache thereof to service the data transaction based on the first set of counters; and
preloading data into the cache based on the second set of counters, the preloading of the data including identifying an address range as being consistently accessed over a consecutive period of time based on the second set of counters, wherein the data preloaded into the cache corresponds to the address range, and wherein the identifying of the address range includes determining, based on the second set of counters, that the address range has been accessed each interval for a number of consecutive intervals greater than a threshold.

8. The method of claim 7 further comprising adjusting the threshold based on a status of the cache.

9. A computing device comprising:
a memory containing machine readable medium comprising machine executable code having stored thereon instructions for performing a method of cache management; and
a processor coupled to the memory, the processor configured to execute the machine executable code to cause the processor to
identify an address space of a memory hierarchy that includes a storage aggregate and a cache;
receive a data transaction directed to an address within the address space;
record a first aspect of the data transaction according to a first address range and a first time interval size;
record a second aspect of the data transaction according to a second address range and a second time interval size, wherein the second address range is larger than the first address range, and wherein the second time interval size is larger than the first time interval size;
service the data transaction using at least one of the storage aggregate or the cache based on the recorded first aspect; and
load a data set into the cache based on the recorded second aspect.

10. The computing device of claim 9, wherein the processor is further configured to execute the machine code to perform: evicting a unit of data from the cache based on the recorded first aspect.

11. The computing device of claim 9, wherein the processor is further configured to execute the machine code to perform: determining the data set to have been consistently accessed for a duration of time based on the recorded second aspect, and
wherein the processor performs the loading of the data set into the cache based on the determining of the data set to have been consistently accessed.

12. The computing device of claim 11, wherein the processor is further configured to execute the machine code to perform: adjusting the duration of time based on at least one of: an amount of available space in the cache or a cache hit rate.

13. The computing device of claim 9, wherein the processor is further configured to execute the machine code to perform: loading the data set into the cache further based on at least one of: an amount of space available in the cache, a predetermined percentage of a total capacity of the cache, or a cache hit rate.

14. A non-transitory machine readable medium having stored thereon instructions for performing a method of cache management comprising machine executable code which when executed by at least one machine, causes the machine to:
identify a memory structure of a computing system;
receive a data transaction directed to an address space of the memory structure;
record the data transaction in a first set of counters;
record the data transaction in a second set of counters having a different granularity that the first set of counters;
identify a hierarchical level of the memory structure to service the data transaction based on the first set of counters;
identify a first data set within a cache of the memory structure to evict based on the first set of counters; and
load a second data set into the cache based on the second set of counters, wherein the load of the second data set includes identifying, based on the second set of counters, an address range having been repeatedly accessed over a duration of time.

15. The non-transitory machine readable medium of claim 14, wherein the first data set evicted from the cache was loaded into the cache based on the second set of counters.

16. The non-transitory machine readable medium of claim 14, comprising further machine executable code that causes the machine to adjust the duration of time based on a status of the cache.

17. The non-transitory machine readable medium of claim 14, comprising further machine executable code that causes the machine to determine a size of the second data set loaded into the cache based on at least one of: an amount of space available in the cache, a predetermined percentage of a total capacity of the cache, or a cache hit rate.

* * * * *